(12) United States Patent
Tsunoda et al.

(10) Patent No.: US 6,870,104 B2
(45) Date of Patent: Mar. 22, 2005

(54) STRUCTURE FOR ATTACHING A HARNESS PROTECTOR USED IN SUPPLYING ELECTRICITY

(75) Inventors: Mitsunori Tsunoda, Shizuoka (JP); Tohru Aoki, Shizuoka (JP); Akira Tsubaki, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/636,630

(22) Filed: Aug. 8, 2003

(65) Prior Publication Data

US 2004/0045734 A1 Mar. 11, 2004

(30) Foreign Application Priority Data

Sep. 6, 2002 (JP) ........................................ 2002-261045

(51) Int. Cl.[7] .............................................. H01B 17/00
(52) U.S. Cl. .................... 174/72 A; 174/68.1; 174/135; 174/48; 174/69
(58) Field of Search ............................. 174/72 A, 68.1, 174/135, 48, 69

(56) References Cited

U.S. PATENT DOCUMENTS 6,087,593 A * 7/2000 Skipworth et al. .......... 174/135

2002/0129962 A1 * 9/2002 Doshita et al. ........... 174/72 A

FOREIGN PATENT DOCUMENTS

JP 2001-35485 2/2001

* cited by examiner

*Primary Examiner*—Dean A. Reichard
*Assistant Examiner*—Jinhee Lee
(74) *Attorney, Agent, or Firm*—Armstrong, Kratz, Quintos, Hanson & Brooks, LLP

(57) ABSTRACT

A structure for attaching a harness protector used in supplying electricity is described in which a harness protector is attached to a vehicle body or a door inner panel of a sliding door for absorbing slack of a wire harness in the harness protector. A reinforcing member is provided on the harness protector for preventing deformation, such as warpage in a thickness direction, of the harness protector. The reinforcing member includes a protector fixing member, a door panel fixing member and a door-trim fixing member. The reinforcing member attaches to the harness protector without any rattle in the thickness direction and is movable along a surface of the harness protector. The reinforcing member incorporates an oblong opening of the harness protector for pulling out the wire harness.

8 Claims, 5 Drawing Sheets

STRUCTURE FOR ATTACHING A HARNESS PROTECTOR USED IN SUPPLYING ELECTRICITY

BACKGROUND OF THE INVENTION

1. Field of the Invention

This invention relates to a structure for attaching a harness protector used in supplying electricity, whereby the harness protector is made of synthetic resin and is attached to a sliding door of a vehicle to absorb a slack of a wire harness associated with opening or closing of the sliding door for continuously supplying elements, such as accessories, in the sliding door with electricity.

2. Description of the Related Art

FIGS. 6 and 7 show a structure for attaching a harness protector for supplying the sliding door of a vehicle with electricity, which structure is the subject of an application applied for previously by an applicant of this invention (Japanese Patent Application Laid-Open No. 2001-35485, p9 to P11, FIG. B).

This harness protector 53 for supplying electricity is composed of a base 54 and a cover 55, both made of synthetic resin, and employed to accommodate a wire harness 52 in a curved state. A flat spring 56 as a resilient member made of metal for urging the wire harness 52 upward, which is a direction of absorbing the slack, is provided inside the harness protector 53. Electric supply equipment is composed of at least the harness protector 53 and the flat spring 56.

The base 54 and cover 55 are locked by a locking means (not shown) such as a locking projection and an engaging frame piece with the wire harness accommodated therein, and the base 54 is fixed to a metal door-panel 58 of a sliding door 57 with a bolt 59, a locking clip or the like. A door-trim (not shown in FIG. 6) made of synthetic resin is attached to the door-panel 58 to cover the door-panel 58, and the harness protector 53 is arranged between the door-panel 58 and the door-trim.

The base 54 and the cover 55 have vertical substrates 60, 61 and circumferential walls 62, 63 formed around the vertical walls 60, 61. By assembling the base 54 and the cover 55, one of both circumference walls 62, 63 is lying on top of the other whereby space for shifting and bending the harness is created between the substrates 60, 61, and a narrow opening 64 through which the harness is drawn is created at a front end of the harness protector 53. An opening 65 of oblong slit shape through which the harness is drawn is created at a lower end of the harness protector 53. A base portion of the flat spring 56 is fixed on the base 54, and a free end of the flat spring 56 supports the wire harness 52. A wall 26 (shown in FIG. 8) for regulating a bending diameter of the wire harness 52 may be provided on the base 54.

One end of the wire harness 52 is pulled out of the opening 64 to be connected to such as an associated wire harness or an accessory (not shown) of the sliding door side through a connector 66, while being fixed to the substrate 60 near the opening 64 at the front end of the flat spring 56 by such as tape winding. The other end of the wire harness 52 is pulled out of a bottom opening 65, being routed to a vehicle body side 68 via a connecting passage 67, being fixed to a harness fixing member 70 near a step 69, and being connected to a wire harness (not shown) of the vehicle body side 68.

When the sliding door 57 is fully closed as shown in FIG. 6, the wire harness 52 is urged upward by the flat spring 56, being curved in a large diameter shape, while being pulled backward. When the sliding door 57 is on the way to open, and nearly fully open from the fully closed state by being shifted backward, the wire harness 52 tends to sag greatly, curving in a small diameter shape, however, the flat spring 56 urges the wire harness 52 upward to prevent the wire harness 52 from sagging. When the sliding door 57 is fully closed from being fully open, the wire harness 52 is also prevented from sagging by the same action. Thus, the wire harness 52 is prevented from being sandwiched between the sliding door 57 and the vehicle body 68. The wire harness 52 swings back and forth in conjunction with opening and closing of the sliding door 57. Incidentally, the showing of the cover 55 is omitted in FIG. 7.

However, according to a conventional structure for attaching a harness protector used in supplying electricity, when a sliding length of the sliding door 57 is short as shown by a chain line in FIG. 8, there is no problem, but when the length of the sliding door 57 is long as shown by a continuous line in FIG. B, a length and slack of a wire harness 19 are increased. Therefore, a synthetic harness protector, of which a base 2' is solely shown in FIG. 8, for accommodating the wire harness 19 is upsized and accordingly a possibility that the harness protector, particularly a cover 3' in FIG. 9, is warped or offset in a thickness direction and particularly in an inward direction is increased. In this case, as shown in FIG. 9, an inner width L of a harness protector 1' in the thickness direction is decreased so that an inner surface of the harness protector 1', particularly a cover 3' thereof, abuts on an outer surface of the wire harness 19. Therefore, a motion, such as bending and swinging, of the wire harness 19 becomes rough so that there is a fear that the slack may not be absorbed smoothly, or the wire harness 19 or an inner surface 28 of the harness protector 1' may become worn out.

Incidentally, FIG. 9 shows the wire harness 19 equipped with a corrugate tube having an ellipse cross-section, however, the wire harness 19 equipped with a corrugate tube having a circular cross-section is also acceptable. A reference numeral 70' in FIG. 8 indicates a harness-fixing member at the vehicle body side.

These problems are caused by the wire harness 19 being easily deformed, and such deformation is caused because the harness protector 1' has an elliptic opening 22' via which the harness is pulled out. There are some ways for reducing warpage of the harness protector 1', such as thickening a wall, elaborating a surface rib form, increasing a number of resin-molded gates of the harness protector 1' or increasing applied pressure of a resin-molding machine, however, any of these leads to a cost rise and is not realistic.

SUMMARY OF THE INVENTION

Accordingly, it is an object of this invention to provide a structure for attaching a harness protector used in supplying electricity which can correct a deformation, such as warpage of a harness protector, particularly a large-sized harness protector, to absorb slack of the wire harness reliably.

The object of the invention has been achieved by providing a structure for attaching a harness protector used in supplying electricity which comprises a harness protector attached to a vehicle body or a door inner panel of a sliding door for absorbing slack of a wire harness in the harness protector, and a reinforcing member provided on the harness protector for preventing deformation such as warpage in a thickness direction of the harness protector.

According to this structure, a large size harness protector made of synthetic resin has increased rigidity with the reinforcing member so as not to be deformed, for example, to be warped. By attaching the reinforcing member to the harness protector, the deformation such as warpage is corrected concurrently. Thus, a width of an inner space of the harness protector for accommodating the wire harness is kept in a specific size over a long term even with an influence of heat etc., and the wire harness can be smoothly shifted, bent and swung in the harness protector without any obstruction with a small frictional resistance as the sliding door is shifted to be open or closed. Thus, the slack is absorbed smoothly and reliably. Therefore, reliability of supplying electricity constantly to the sliding door, particularly when using a large-sized harness protector, is improved.

Preferably, in the structure, the reinforcing member has a fixing member for fixing the harness protector to the reinforcing member. In this structure, the reinforcing member is fixed to the harness protector by the fixing member. Because the reinforcing member is fixed to the harness protector, bending rigidity of the harness protector is increased and the deformation, such as warpage, of the harness protector is corrected concurrently with the fixation. Therefore, an inside width of the harness protector is stably secured over a long period, and the reliability of supplying electricity constantly to the sliding door is improved.

Preferably, in the structure, the fixing member is stuck to the harness protector without any rattle in the thickness direction of the harness protector and is movable along a surface of the harness protector.

According to this structure, a deformation of the harness protector in the thickness direction is corrected and prevented, so that an inner width of the harness protector is secured regularly. Additionally, such as heat distortion caused by a difference in expansion coefficient of the harness protector made of synthetic resin and that of the metal reinforcing member is eliminated along the surface of the harness protector, so that the harness protector and the reinforcing member are free from an excessive stress, and the deformation of the harness protector is prevented. Therefore, the wire harness is smoothly shifted, bent and swung in the harness protector without any catch constantly and the reliability of supplying electricity to the sliding door is improved. Moreover, the reinforcing member can be easily attached to the harness protector owing to an assembling play along the harness protector surface.

Preferably, in the structure, the fixing member for fixing the harness protector to the reinforcing member includes a large hole and a small hole communicating via a punch part with the large hole. Further, an engaging projection having a shaft portion and a head portion with a large diameter is provided on the harness protector, wherein said head portion is sized to penetrate said large hole, and said shaft portion is sized to advance past the punch part and engage with said small hole. According to this structure, when fixing the reinforcing member to the harness protector, the head portion is inserted into the large hole. Subsequently by pulling down the reinforcing member, the shaft portion with a small diameter is inserted into the small hole to be engaged with said hole. Thus, the reinforcing member is easily and reliably attached to the harness protector. Therefore, workability of assembling the reinforcing member is improved.

Preferably, in this structure, the shaft portion is movable in a radial direction within the small hole. According to this structure, for example, when the heat distortion caused by a difference in expansion coefficient of the harness protector made of synthetic resin and that of the metal reinforcing member is applied, by the shaft portion moving in the radial direction inside the small hole to eliminate the heat distortion along the surface of the harness protector, the harness protector and the reinforcing member become free from the excessive stress, so that the deformation of the harness protector is prevented. Therefore, the wire harness is smoothly shifted, bent and swung in the harness protector constantly without any catch, and the reliability of supplying electricity to the sliding door is improved.

Preferably, in the structure, the reinforcing member is formed in a rectangular-plate shape and the fixing member for fixing the harness protector to the reinforcing member is stuck on the surface of the harness protector by surface contact.

According to this structure, the reinforcing member in a rectangular plate shape is stuck on the surface of the harness protector by surface contact to correct such as the warpage of the harness protector and insure that it possess a flat shape. By supporting the reinforcing member at both rigid ends of the harness protector across the harness protector, the capability of the reinforcing member for correcting the deformation is improved further. Therefore, the wire harness is smoothly shifted, bent and swung in the harness protector constantly without any catch and the reliability of supplying electricity to the sliding door is improved.

Preferably, in the structure, the reinforcing member for the harness protector includes a fixing member for fixing a door inner panel to the reinforcing member. According to this structure, after fixing the reinforcing member to the harness protector, by fixing the reinforcing member to the door inner panel by the fixing member for the door inner panel, the harness protector is fixed to the door inner panel through the reinforcing member. In this manner, the deformation, such as warpage, of the harness protector is further reliably corrected and prevented. In particular, by fixing the reinforcing member in the rectangular-plate shape to the door inner panel while supporting the reinforcing member at both ends, bending rigidity of the reinforcing member is increased and the deformation of the harness protector is further reliably corrected and a further deformation is prevented. Therefore, the wire harness can smoothly be shifted, bent or swung constantly in the harness protector without any catch and the reliability of supplying electricity to the sliding door is improved. Moreover, by fixing the harness protector to the door inner panel by the reinforcing member, the number of members of the harness protector required for fixing to the door inner panel is reduced.

Preferably, in the structure, the reinforcing member includes a fixing member for fixing a door-trim to the reinforcing member. According to this structure, by fixing the reinforcing member, previously fixed to the harness protector, to the door-trim or to both the door inner panel and the door-trim, bending strength of the reinforcing member is increased. Therefore, the ability of the harness protector to correct the deformation and prevent the further deformation is increased. Moreover, by fixing the door-trim to the harness protector by the reinforcing member or through the reinforcing member, the strength of the door-trim is increased to prevent the deformation of the door-trim. Therefore, the wire harness is smoothly shifted, bent and swung in the harness protector constantly without any catch and the reliability of supplying electricity to the sliding door is improved.

Preferably, in the structure, the fixing member for fixing the door-trim to the reinforcing member is projected closer to the door-trim than the fixing member for fixing the harness protector to the reinforcing member.

According to this structure, a gap is formed between the door-trim and the harness protector. Therefore, even if the door-trim is deformed to some degree by being pressed, a top of deformed surface of the door-trim does not reach the harness protector, so that deformation of the harness protector is prevented.

Preferably, in the structure, the reinforcing member is arranged near an oblong opening of the harness protector for pulling out the wire harness.

According to this structure, narrowing the oblong opening of the harness protector is prevented, and pulling the wire harness in and out of the harness protector is done smoothly without any catch. Thus, the harness slack is absorbed smoothly and reliably. Therefore, reliability of supplying electricity to the sliding door is improved.

DESCRIPTION OF THE PREFERRED EMBODIMENT

One embodiment of the present invention will now be described below with reference to the figures.

Figure 1:
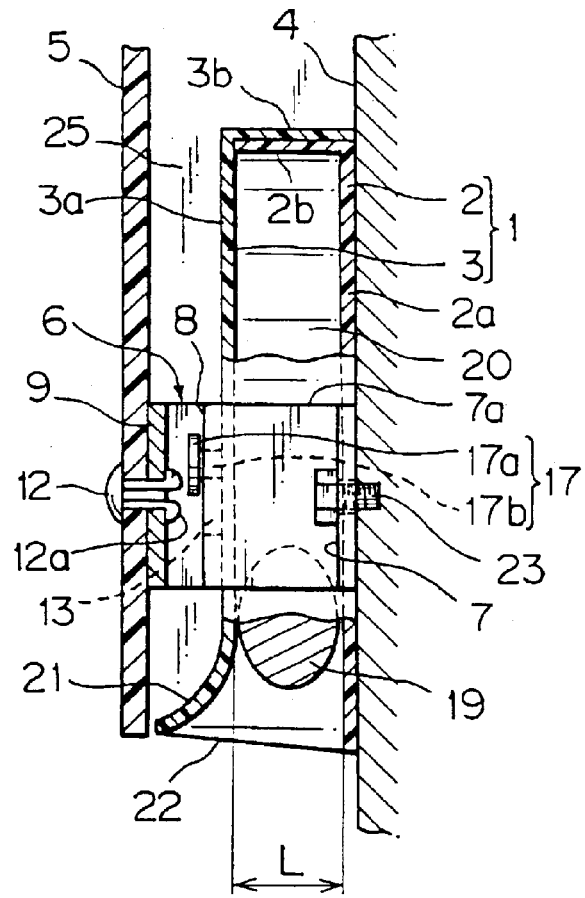
FIG. 1 is a partial sectional view showing one embodiment of a structure for attaching a harness protector used in supplying electricity according to this invention.

FIG. 1 shows one embodiment of the structure for attaching the harness protector used in supplying electricity according to the present invention.

In FIG. 1, reference numeral 1 indicates a harness protector made of synthetic resin used in supplying electricity (hereafter referred to as merely the harness protector), numeral 4 indicates a metallic door inner panel of the sliding door, numeral 5 indicates a door-trim made of synthetic resin of the sliding door, and numeral 6 indicates a metallic reinforcing board (reinforcing member) as a substantial part of the present invention. The reinforcing board 6 is fixed on a surface of a protector cover 3 of the harness protector 1, a surface of the door inner panel 4, and a back surface of the door-trim 5.

Figure 2:
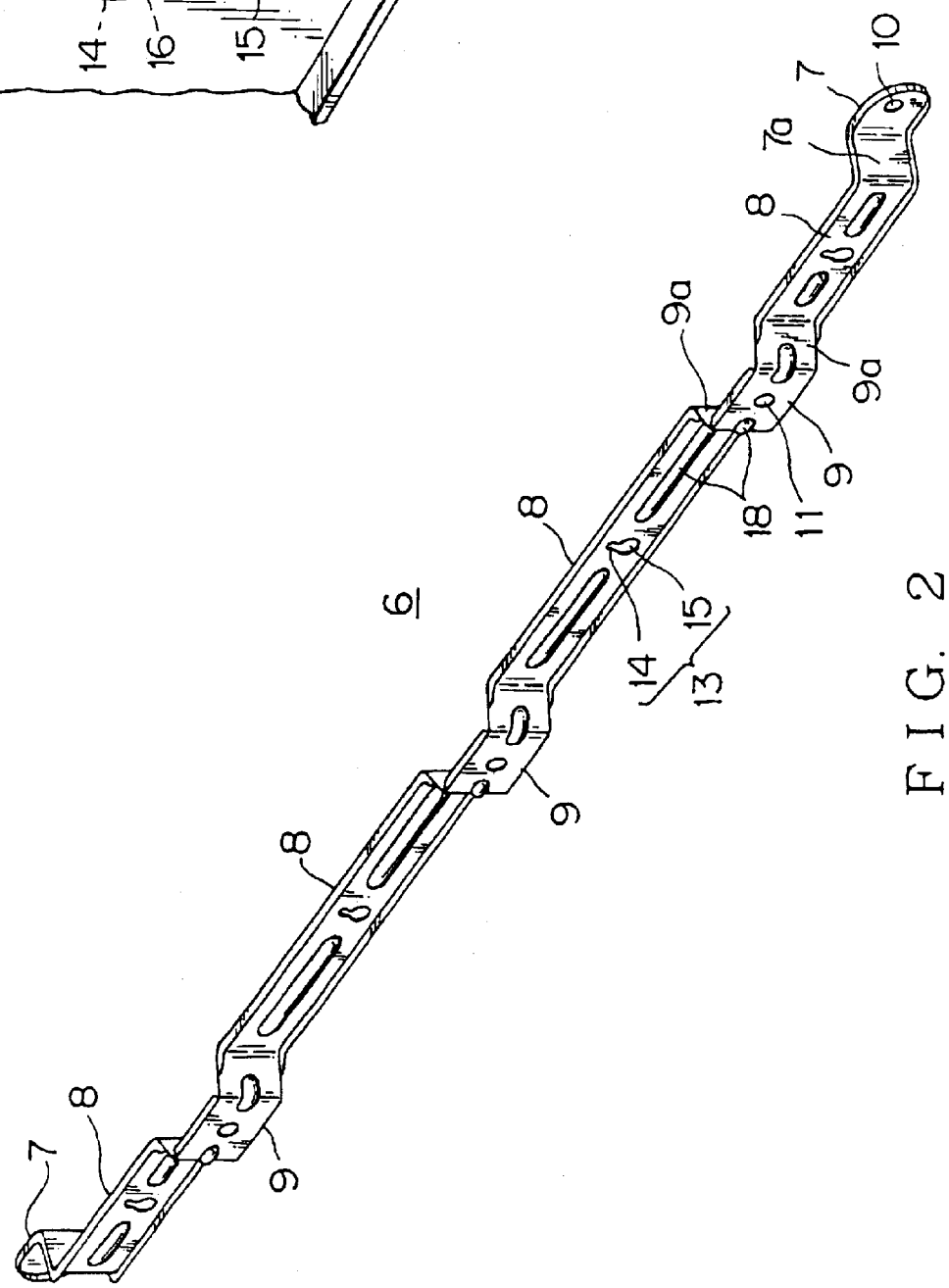
FIG. 2 is a perspective view showing one embodiment of a reinforcing board of the structure.

In other words, as shown in FIG. 2, the reinforcing board 6 is formed of an oblong and rectangular-plate shape, having a fixing member 7 for the door inner panel (hereafter referred to as the door-panel fixing member) at each end in the longitudinal direction, a fixing member 8 for the harness protector (hereafter referred to as the protector-fixing member) and a fixing member 9 for the door-trim (hereafter referred to as the door-trim fixing member) at a middle in the longitudinal direction.

The protector-fixing member 8 is arranged at a center in a thickness direction of the reinforcing board 6. The door-panel fixing member 7 is projected to a back surface of the protector fixing member 8. The door-trim fixing member 9 is projected to the front surface of the protector-fixing member 8.

In this embodiment, four protector-fixing members 8 are formed in a longitudinal direction of the reinforcing board 6, much longer than other fixing members 7, 9, occupying almost all of full length of the reinforcing board 6 to make surface contact with the protector cover 3 throughout almost full length of the protector cover 3.

The door-panel fixing member 7 is composed of a supporting wall 7a curved almost right-angled from the protector-fixing member 8 at each end in the longitudinal direction toward the back surface of the protector-fixing member 8 and a connecting wall having the door-panel fixing member 7 curved parallel to the protector-fixing member 8 from the supporting wall 7a. A hole 10 for inserting a bolt or a locking clip is provided at each connecting wall 7.

Moreover, each door-trim fixing member 9 is arranged at each of three boundaries of four protector fixing members 8, composed of a pair of supporting walls 9a projecting from each protector fixing member 8 toward the door-trim in a slightly inclined shape and the connecting wall having door-trim fixing member 9 for connecting both ends of the pair of supporting walls 9a, said connecting wall being parallel to the protector fixing member 8. A hole 11 for inserting such as a locking clip is provided at each connecting wall 9.

The connecting wall of the door-trim fixing member 9 is formed as large as the connecting wall of the door-panel fixing member 7. A locking clip 12 is, like an example shown in FIG. 1, made of synthetic resin and composed of a head part and claw portion 12a having more than two resilient claws.

Figure 3:
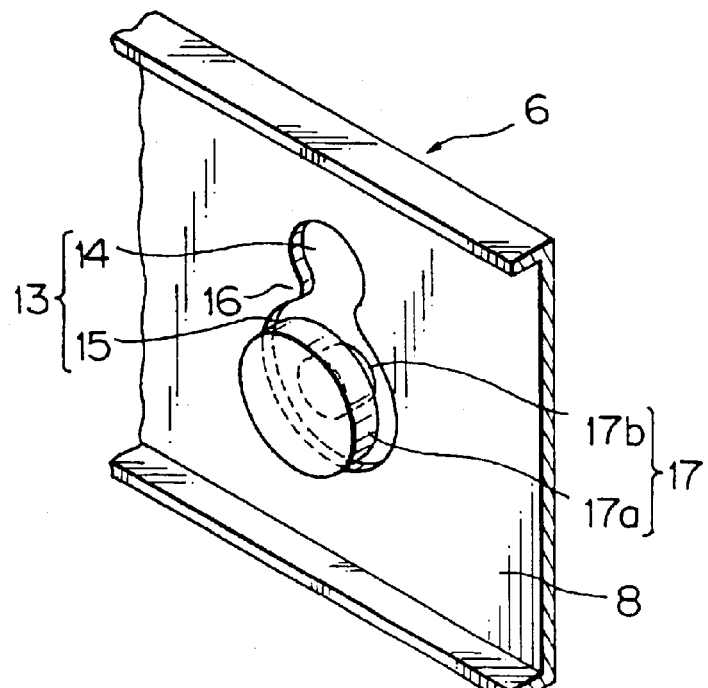
FIG. 3 is a partial perspective view of a substantial part of the one embodiment showing the reinforcing board and the harness protector which are engaged with each other initially.

As shown in FIG. 2, a hole 13 in a roughly gourd shape is provided on each protector fixing member 8 in a center of the longitudinal direction. As shown in FIG. 3, the hole 13 is composed of a substantially circular hole 14 with a small diameter at upper side, a substantially circular hole 15 with a large diameter at lower side communicating with the small hole 14, and a narrow pinched part 16 arranged in boundary of two holes 14, 15.

As shown in FIGS. 1 and 3, a projection 17 for engaging with the hole 13 is provided at a surface of the protector cover 3. The engaging projection 17 is composed of a head 17a with a large diameter and a shaft 17b with a small diameter. The diameter of the head 17a is a little smaller than that of the large hole 15 and is a little larger than that of the small hole 14. The shaft 17b is so formed that its diameter is a little smaller than those of the pinched portion 16 and the small hole 14 are.

Because the diameter of the small hole 14 is a little larger than that of the shaft 17b, an initial displacement between the engaging projection 17 and the small hole 14 in a radial direction, and a displacement after fixing corresponding to such as a heat shrinkage caused by a difference in thermal expansion coefficients of the harness protector 1 made of synthetic resin and that of the reinforcing board 6 made of metal can be absorbed.

Moreover, a length of the shaft 17b, namely a projection length from the protector cover 3, is adjusted to be substantially equal to the thickness of the protector fixing member 8 of the reinforcing board 6. Additionally, the length of the shaft 17b is adjusted so that the reinforcing board 6 may not rattle in a direction of the shaft of the engaging projection 17 at least when fixing initially.

Figure 5:
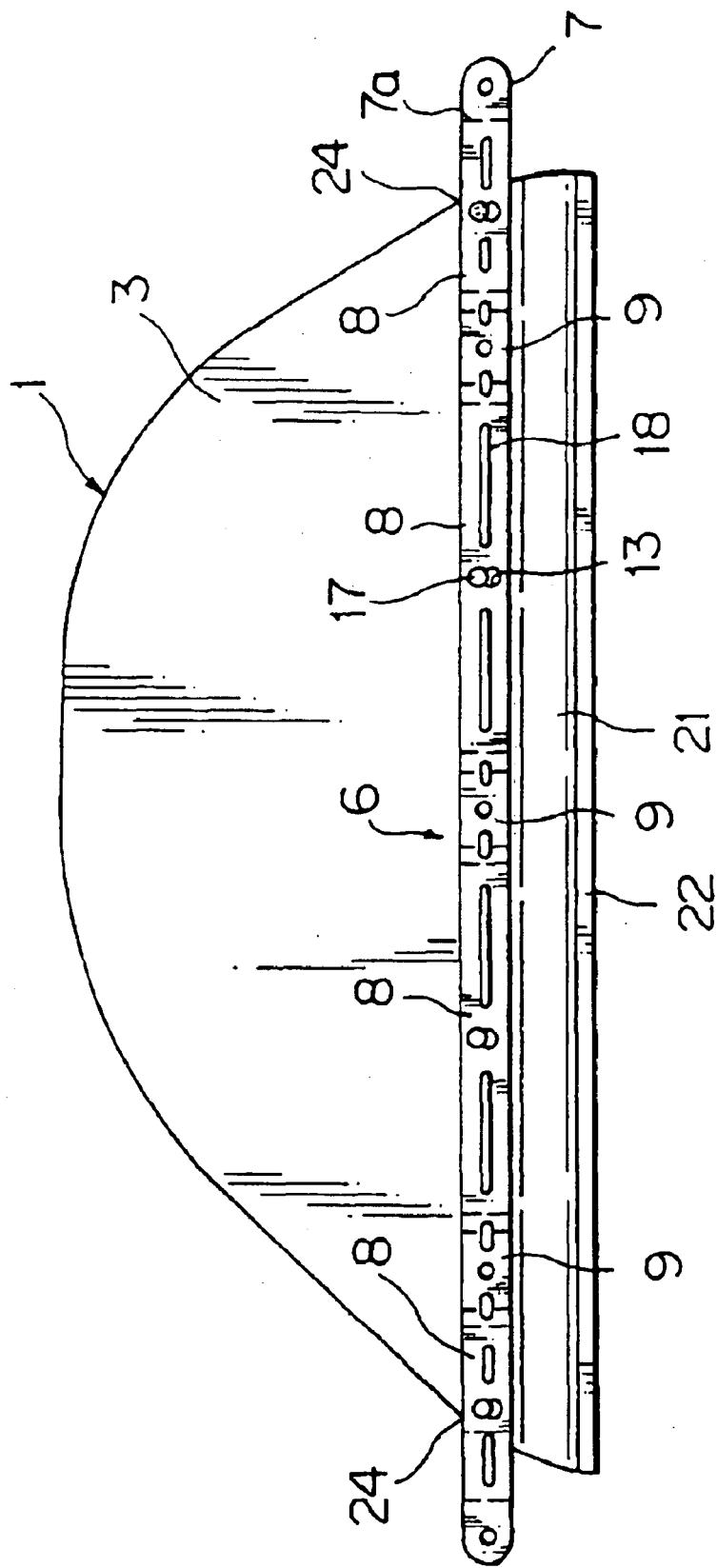
FIG. 5 is a front view showing the harness protector and the reinforcing board assembled together.
Figure 9:
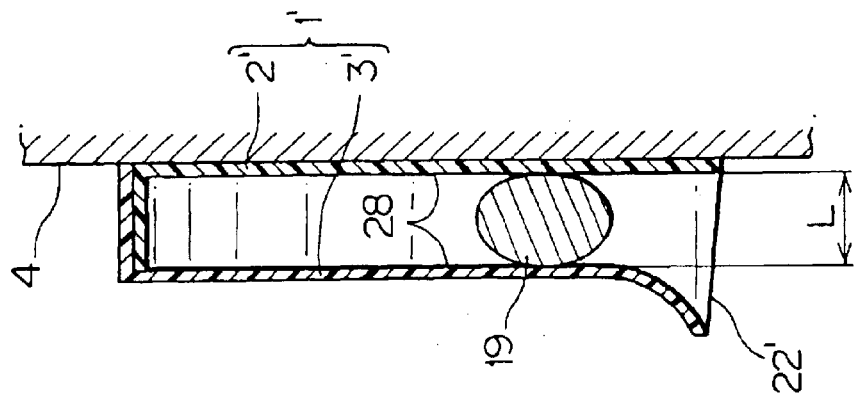
FIG. 9 is a longitudinal sectional view for explaining problems of a large sized harness protector.
Figure 6:
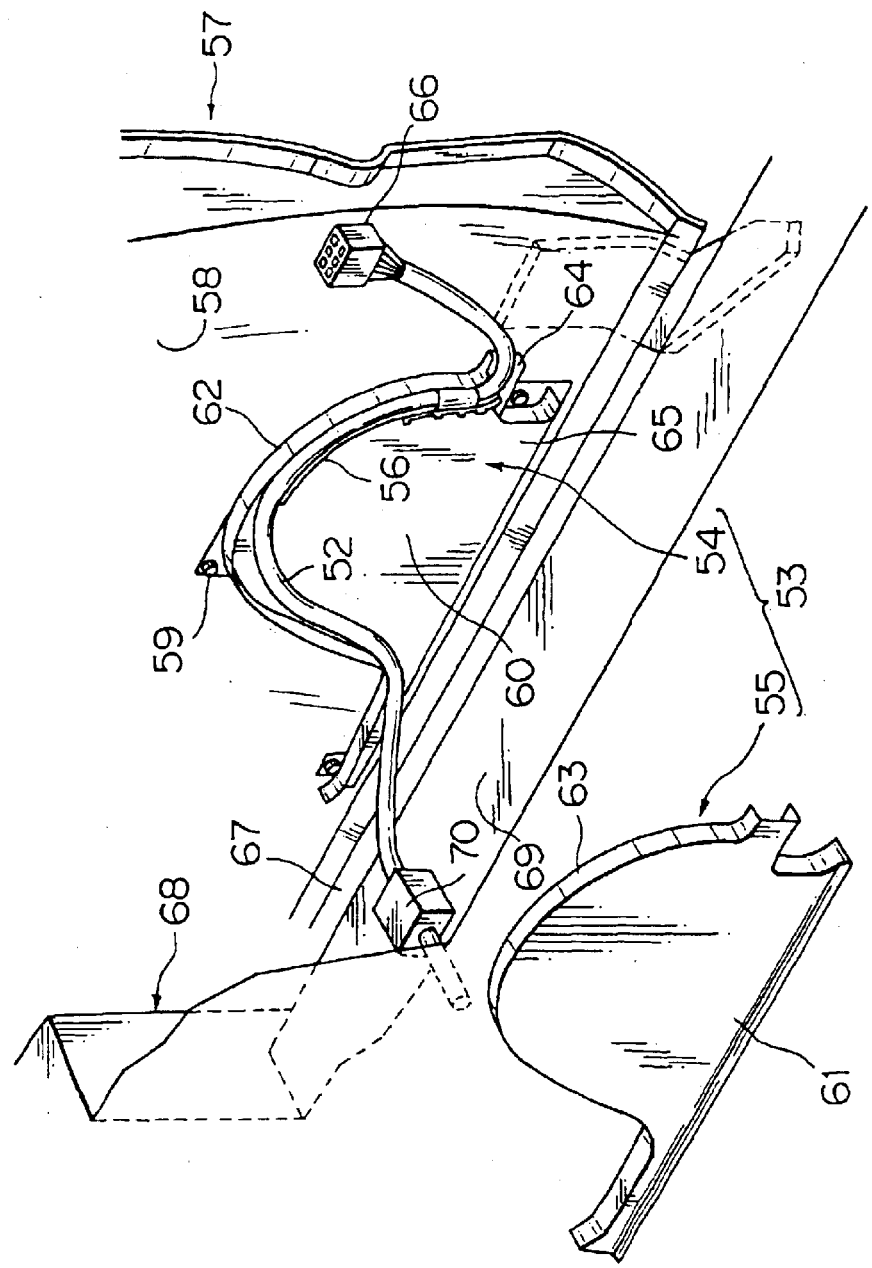
FIG. 6 is an exploded perspective view of a fully opened sliding door showing conventional structure for attaching the harness protector used in supplying electricity.
Figure 7:
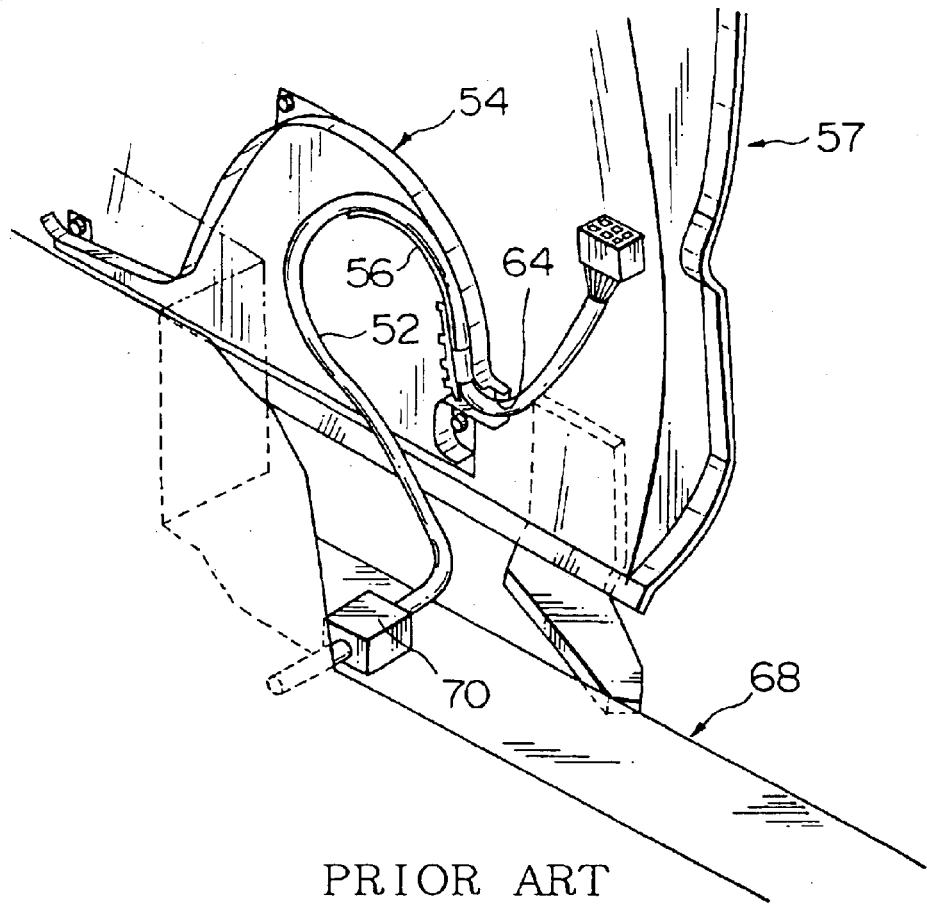
FIG. 7 is a perspective view of the nearly fully opened sliding door showing the conventional structure.

The engaging projection 17 and the protector cover 3 are resin-molded integrally. As shown in FIG. 5, a plurality of the engaging projections 17 are provided corresponding to a number and positions of the holes 13. Additionally, the engaging projection 17 may be made of such as metal, independent of the protector cover 3, and a part of the engaging projection 17 may be fixed on the protector cover 3 by insert-molding.

As shown in FIG. 1, each hole 13 is provided at a center of height of the reinforcing board 6, and beads 18, namely projected lines for reinforcing, are formed in a longitudinal direction of the reinforcing board 6 by bulge forming at the front surface of the reinforcing board 6 except for at least the holes 13. The bead 18 is easily formed by beading while punching or bending the reinforcing board 6. The bending rigidity of the rectangular-plate shaped reinforcing board 6 is increased by the beads 18.

As shown in FIG. 1, first, the harness protector 1 accommodating the wire harness 19 is fixed on the door inner panel 4, next the reinforcing board 6 is fixed on the protector cover 3. Namely, as shown in FIG. 3, by inserting the head 17a of the engaging projection 17 of the harness protector 1 into the lower hole 15 with a large diameter of the reinforcing board 6 in the axial direction of the harness protector 1, and then depressing the reinforcing board 6 in a direction of an arrow A shown in FIG. 4, the shaft 17a with a small diameter of the engaging projection 17 is passed through the pinched part 16 to the upper hole 14 with a small diameter in the radial direction of the hole 15.

As shown in FIG. 1, the head 17a of the engaging projection 17 is in contact with the front surface of the reinforcing board 6 without rattle. A surface of the protector cover 3 is in contact with the back surface of the reinforcing board 6 without rattle. Even if the protector cover 3 has been warped inward before the reinforcing board 6 is attached thereto, by attaching the reinforcing board 6 to the protector cover 3, the warpage of the protector cover 3 is corrected, a harness accommodation space 20 in the harness protector 1 is secured having an original inner width L, and the inner width L is stabilized over a long period of time. Thus, the wire harness is smoothly shifted, bent and swung in the harness protector without such as any catch as the sliding door is shifted to be open or closed.

Moreover, as shown in FIG. 1, if the protector cover 3 has been warped outward before the reinforcing board 6 is attached thereto, by attaching the reinforcing board 6 to the protector cover 3, the warpage of the protector cover 3 is corrected, a vertical substrate 3a of the protector cover 3 turns flat, the harness accommodation room 20 in the harness protector 1 is secured an original inner width L, and it prevents from generating a rattle of the wire harness 19 in a radial direction in the harness protector 1 and its accompanying allophone. A peripheral wall 3b of the protector cover 3 and a peripheral wall 2b of the protector base 2 overlap with each other.

As shown in FIG. 5, the reinforcing board 6 is attached horizontally crossing the harness protector 1, a little above a harness-guiding portion 21 having a curved longitudinal section at a lower end of the protector cover 3. The door-panel fixing member 7 of the reinforcing board 6 and its neighbor are positioned at both back and forth ends of the harness protector 1 in a projecting form. As shown in FIG. 1, an oblong opening 22 for pulling out the harness is positioned inside the harness-guiding portion 21. The reinforcing board 6 avoids the harness-guiding portion 21, and reinforces almost the full length of the harness protector 1 near the opening 22. Thereby, an original inner width L of the oblong opening 22 is secured in a thickness direction over a long period of time.

Figure 4:
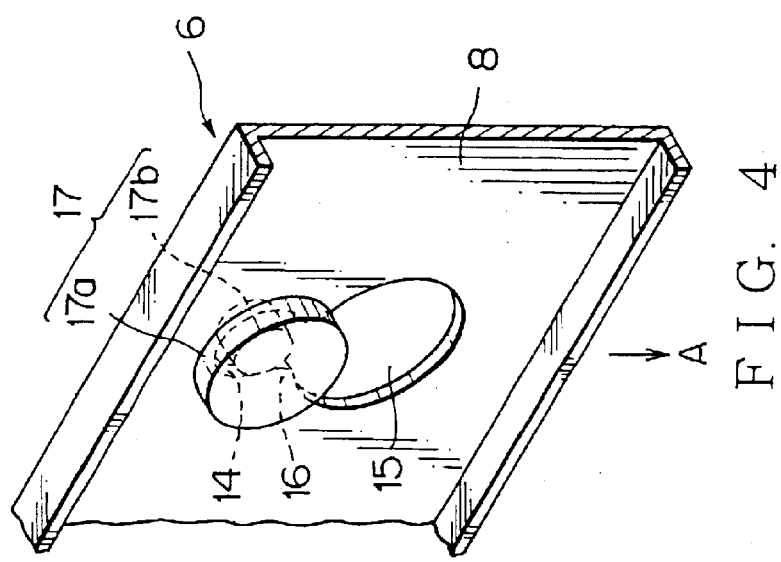
FIG. 4 is a partial perspective view of a substantial part of the reinforcing board and the harness protector similar to FIG. 3 and both being engaged with each other finally.

In FIGS. 4 and 5, because the diameter of the shaft 17b of the engaging projection 17 of the harness protector 1 is smaller than that of the small hole 14 of the reinforcing board 6, and a little gap is formed between the shaft 17b and the small hole 14 in a radial direction, the shaft 17b and the small hole 14 are relatively a little movable in the radial direction along the surface of the protector cover 3. Therefore, as above described, for example, the heat distortion caused by a difference in expansion coefficient of the harness protector 1 made of synthetic resin and that of the metallic reinforcing member 6 is eliminated, so that the harness protector 1 is free from an excessive stress and the deformation of the harness protector 1 is prevented.

As shown in FIG. 1, after attaching the reinforcing board 6 to the harness protector 1, the reinforcing board 6 is fixed to the door inner panel 4. As shown in FIGS. 1 and 5, said fixation to the door inner panel 4 is done by fastening or locking each door-panel fixing member 7 at each end of the reinforcing board 6 to the door inner panel 4 by a bolt 23 or a locking clip. Thus, an outer surface of a vertical substrate 2a of the protector base 2 is in contact with the surface of the door inner panel 4 without any gap.

As shown in FIG. 5, before fixing the door-panel fixing member 7 to the door inner panel 4, the deformation such as the warpage has already largely been corrected by the straight reinforcing board 6 which are supported by two side parts 24 as fulcrums near the peripheral walls 3b of the harness protector 1. However, as shown in FIG. 2, by fixing the door-panel fixing member 7 at two ends thereof to the door inner panel 4, the protector fixing member 8 is supported at the supporting walls 7a by the door inner panel 4. Thus, the reinforcing board 6 is supported at its two ends, so that the bending rigidity of the reinforcing board 6 is increased and the deformation such as warpage of the protector cover 3 is corrected further reliably and permanently. Moreover, because the harness protector 1 is fixed to the door inner panel 4 through the reinforcing board 6, numbers of bolts and locking clips for fixing the harness protector 1 solely to the door inner panel 4 can be decreased.

As shown in FIG. 1, after fixing the reinforcing board 6 to the door inner panel 4, the door-trim 5 made of synthetic resin is attached to the door inner panel 4, so that the harness protector 1 is positioned in between the door inner panel 4 and the door-trim 5. Then, the door-trim 5 is fixed to the door-trim fixing members 9 of the reinforcing board 6 by fixing members such as locking clips 12, and the door-trim 5 is supported by the projecting door-trim fixing member 9 with a gap 25 between the door-trim 5 and the harness protector 1.

In this manner, for example, even when a passenger or a baggage deforms the door-trim 5 to some degree by pressing, the projected door-trim fixing member 9 absorbs the pressing force to protect the harness protector 1 against the outer force. Thus, the harness protector 1 is protected against the deformation such as a dent. Moreover, by fixing the reinforcing board 6 to both the door inner panel 4 and the door-trim 5 in a thickness direction thereof, the reinforcing board 6 is further reliably prevented from bending and the harness protector 1 is further reliably corrected the deformation and protected against the deformation.

Additionally, because the wire harness 19 is pulled out from the lower end of the door-trim 5 to the vehicle body side, conventionally the lower end of the door-trim 5 can not be fixed, so that the rigidity of the door-trim 5 is low. However, by fixing the lower end of the door-trim 5 to the door inner panel 4 through the reinforcing board 6, the rigidity of the door-trim 5 is increased, so that an allophone or the like caused by the deformation or a vibration of the door-trim 5 is prevented.

Figure 8:
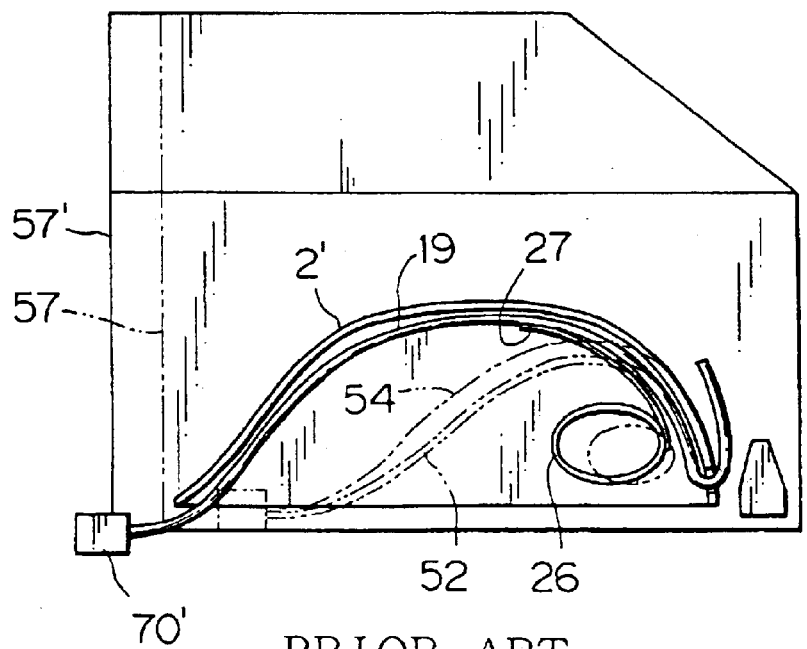
FIG. 8 is a front view of the harness protector having alternative forms according to a difference in sliding length of the sliding door.

By fixing an inner portion of a ring-shaped limiting wall 26 for limiting the bending of the harness to the door inner panel 4 with such as a bolt, a deformation such as warpage of the protector base 2 is corrected. Therefore, no particular reinforcing member is necessary for the protector base 2. An opening (not shown) is provided on the protector cover 3 inside the limiting wall 26 as shown in FIG. 8, and the protector base 2 is clamped by such as a bolt through the opening.

Incidentally, the means for fixing the reinforcing board 6 to the harness protector 1 as described above is not limited to the engaging projection 17 or the hole 13, but can be any suitable means as needed. Further, it is also possible to omit the door panel fixing member 7 and/or the door-trim fixing member 9 from the reinforcing board 6. Further, as shown in FIG. 1, for the sake of securing the gap size L of the oblong opening 22, preferably the reinforcing board 6 is attached to the harness protector 1 near the opening 22. However, even when the reinforcing board 6 is attached at a middle of a height of the harness protector 1 or its neighborhood, said effect for securing the gap size can be acquired to some degree.

Moreover, the shape of the reinforcing board 6 is not limited to the rectangular-plate shape, but can be any suitable shape such as a inverted T shape, or a horizontal Y shape as needed. Moreover, a bar shaped or a thick reinforcing member can be acceptable instead of the thin reinforcing board 6. Moreover, the reinforcing board 6 can be attached to the harness protector 1 by integral molding (such as insert molding), bonding, or welding. Moreover, preferably the reinforcing board 6 is made of metal, however, the reinforcing board 6 can be made of synthetic resin if its bending rigidity is high enough. Moreover, instead of the pinched part 16 through which the small hole 14 communicates with the large hole 15 as shown in FIG. 3, a straight inner surface at each side of the small hole 14 can be provided to engage the shaft 17b with the small hole 14 without any rattle in a radial direction.

Moreover, the harness protector 1 can be composed of both the protector base 2 and the protector cover 3 resin molded integrally. Moreover, if the harness protector 1 is not fixed to the sliding door, but fixed to the vehicle body vertically or horizontally, the wire harness 19 can be routed through the oblong opening 22 to the sliding door. Moreover, without a flat spring 27 shown in FIG. 8 in the harness protector 1, by imparting resiliency to the harness protector 1 itself, the wire harness 19 can absorb the slack of its own. Further, such reinforcing board 6 as described above is applicable to an existing small protector. Moreover, a shape of the flat spring, a structure for fixing the flat spring 27 to the protector base 2 and the like can be configured as necessary.

Although this invention has been fully described by way of examples with reference to the accompanying drawings, it is to be noted that various changes and modifications can be made in a scope of this invention.

What is claimed is:

1. A structure for attaching a harness protector used in supplying electricity between a vehicle door panel and a door trim panel disposed substantially parallel to and spaced from said door panel, said structure comprising, in combination:

a harness protector including a base and a cover cooperating with said base to define an enclosure within which a wire harness can shift, bend and swing, said harness protector being disposed in a space between said vehicle door panel and said door trim panel, and a reinforcing member comprising an elongated board defining at least one harness protector-fixing portion extending longitudinally of said harness protector and at least one door trim fixing portion being laterally offset from said harness protector-fixing portion disposed at opposite ends thereof, and means for attaching said door trim panel to said door trim fixing portion.

2. The structure as claimed in claim 1, wherein the lateral offsets in said reinforcing member are stepped offsets defining means operative to prevent warpage in the thickness direction of the harness protector.

3. The structure as claimed in claim 1, wherein the reinforcing member further comprises a pair of door panel-fixing portions at both ends of the reinforcing member in a lateral direction, and door panel-fixing portions being laterally offset from said harness protector-fixing member in a direction opposite the direction offset of said door trim-fixing portions, and wherein the structure further comprises means for attaching each door panel-fixing portion to said vehicle door panel.

4. The structure as claimed in claim 1, wherein the harness protector-fixing portion of the reinforcing member is secured to the harness protector by means to prevent any rattle in the thickness direction of the harness protector, said means permitting movement of the reinforcing member along a surface of the harness protector.

5. The structure as claimed in claim 4, wherein the harness protector-fixing portion of the reinforcing member includes a large hole and a small hole communicating via a pinch part with the large hole, wherein an engaging projection having a shaft portion and a head portion with a large diameter is provided on the harness protector, wherein said head portion is sized to penetrate said large hole, and said shaft portion is sized to advance past said pinch part and engage with said small hole.

6. The structure as claimed in claim 5, wherein the shaft portion of said engaging projection is of a size to be movable in a radial direction within the small hole.

7. The structure as claimed in claim 1, wherein the reinforcing member is formed as a plate of substantially rectangular shape and wherein the harness protector-fixing portion of the reinforcing member fixes the harness protector in surface contact with the surface of the harness protector-fixing portion.

8. The structure as claimed in claim 1, wherein the harness protector has an oblong opening for pulling out the wire harness, and the reinforcing member is disposed adjacent, and is substantially coextensive with, the oblong opening.

* * * * *